United States Patent
Gunnerman et al.

(10) Patent No.: US 7,275,440 B2
(45) Date of Patent: *Oct. 2, 2007

(54) LOOP-SHAPED ULTRASOUND GENERATOR AND USE IN REACTION SYSTEMS

(75) Inventors: Rudolf W. Gunnerman, Reno, NV (US); Charles I. Richman, Reno, NV (US)

(73) Assignee: Sulphco, Inc., Sparks, NV (US)

( * ) Notice: Subject to any disclaimer, the term of this patent is extended or adjusted under 35 U.S.C. 154(b) by 153 days.

This patent is subject to a terminal disclaimer.

(21) Appl. No.: 10/994,166

(22) Filed: Nov. 18, 2004

(65) Prior Publication Data

US 2006/0101919 A1 May 18, 2006

(51) Int. Cl.
*G01N 29/34* (2006.01)
*H01L 41/06* (2006.01)
*H01L 41/12* (2006.01)
*H02N 2/00* (2006.01)

(52) U.S. Cl. ................ 73/643; 310/26; 310/316; 318/118

(58) Field of Classification Search ............ 73/643, 73/649; 156/580.1, 580.2; 318/118, 114, 318/126–128; 310/26, 316
See application file for complete search history.

(56) References Cited

U.S. PATENT DOCUMENTS

| | | | |
|---|---|---|---|
| 4,168,295 A | 9/1979 | Sawyer | |
| 4,531,934 A | 7/1985 | Kossovsky et al. | |
| 4,556,467 A | 12/1985 | Kuhn et al. | |
| 4,579,000 A | 4/1986 | Sudo | |
| 5,057,182 A | 10/1991 | Wuchinich | |
| 5,208,787 A | 5/1993 | Shirley | |
| 5,360,498 A | 11/1994 | Blomqvist et al. | |
| 5,486,733 A | 1/1996 | Yamazaki et al. | |
| 5,854,589 A | 12/1998 | How et al. | |
| 5,892,315 A * | 4/1999 | Gipson et al. ............... 310/317 |
| 5,900,690 A * | 5/1999 | Gipson et al. .......... 310/316.01 |
| 6,020,277 A * | 2/2000 | Jameson ..................... 442/414 |

(Continued)

FOREIGN PATENT DOCUMENTS

WO    WO95/24999 A1    9/1995

(Continued)

OTHER PUBLICATIONS

Nyce, "Magnetostrictive Position Transducers in Medical Applications", MTS Systems Corporation Technical Paper pp. 1-5.

(Continued)

*Primary Examiner*—Hezron Williams
*Assistant Examiner*—Jacques M Saint-Surin
(74) *Attorney, Agent, or Firm*—Townsend and Townsend and Crew LLP.; M. Henry Heines

(57) ABSTRACT

Ultrasound for use in chemical reactions is generated by an electromagnet formed from an ultrasound transducer whose central feature is a loop of magnetostrictive material wound with coils oriented to produce an oscillating magnetostrictive force when an oscillating voltage is applied. The oscillations in the transducer loop are transmitted to an ultrasonic horn that is immersed in a reaction medium where the ultrasonic vibrations are transmitted directly to the reaction mixture.

40 Claims, 5 Drawing Sheets

U.S. PATENT DOCUMENTS

| | | | |
|---|---|---|---|
| 6,047,876 A * | 4/2000 | Smith | 228/111.5 |
| 6,188,186 B1 * | 2/2001 | Kong et al. | 318/118 |
| 6,315,215 B1 * | 11/2001 | Gipson et al. | 239/102.2 |
| 6,545,060 B1 | 4/2003 | Ruhman et al. | |
| 6,720,684 B2 | 4/2004 | Czimmek | |
| 2004/0227414 A1 | 11/2004 | Gunnerman et al. | |
| 2005/0274600 A1 * | 12/2005 | Gunnerman | 204/157.5 |
| 2006/0158063 A1 * | 7/2006 | Mori | 310/326 |
| 2006/0196915 A1 * | 9/2006 | Gunnerman | 228/110.1 |
| 2006/0260405 A1 * | 11/2006 | Gunnerman et al. | 73/643 |

FOREIGN PATENT DOCUMENTS

WO      WO98/22277 A1     5/1998

OTHER PUBLICATIONS

"Magnetistrictive Linear Position Sensors: How they work", http://www.sensorland.com/HowPage024.html.

"Welcome to Magnetostrictive Transducers, Actuators, and Sensors @ Iowa State University . . . ", http://www.public.iastate.edu/~terfenol/homepage.html.

Group Arnold, "Soft Magnetics Application Guide", p. 30.1-p. 30.37 (2000).

Dorf, "Electrical Engineering Handbook" IEEE Press ISBN 0-8493-0185-8 (1993).

Advanced Chemistry Labs, Inc., "List of Parameters and Methods", pp. 1-6.

"Giant Magnetostriction", http://www.tf.uni-kiel.de/matwis/amat/elmat_en/kap_6/advanced/t6_3_2.html.

"Magnetostriction: Why does the transformer hum ?", http://hyperphysics.phy-astr.gsu.edu/hbase/solids/magstrict.html.

"Magnetostriction", http://www.physics.hull.ac.uk/magnetics/Research/Facilities/Magnetostriction/magnetostrict. . . .

Bulova, "Tuning Fork Watches", http://216.239.37.104/search?q+cache:Nyw_QGFgFN4C:www.iit.edu/~matleri/bulova.html. . . .

* cited by examiner

US 7,275,440 B2

LOOP-SHAPED ULTRASOUND GENERATOR AND USE IN REACTION SYSTEMS

BACKGROUND OF THE INVENTION

1. Field of the Invention

This invention resides in the field of process equipment used in the treatment of materials in liquid media by ultrasound.

2. Description of the Prior Art

The use of ultrasound for driving chemical reactions is well known. Examples of publications that describe chemical uses of ultrasound are Suslick, K. S., *Science*, vol. 247, p. 1439 (1990), and Mason, T. J., *Practical Sonochemistry, A User's Guide to Applications in Chemistry and Chemical Engineering*, Ellis Norwood Publishers, West Sussex, England (1991). Of the various sonicating systems that have been developed, those known as "probe"-type systems include an ultrasonic transducer that generates ultrasonic energy and transmits that energy to an ultrasonic horn for amplification.

Ultrasound generators are generally of limited energy output due to the power needed to drive the vibrations and the heat generated by ultrasonic transducers. Because of these limitations, the use of ultrasound for large-scale chemical processes has met with limited success. One means of achieving ultrasonic vibrations at a relatively high power is by the use of magnetostriction-driven ultrasound transducers, but frequencies attainable by magnetostriction drives are still only moderate in magnitude. Disclosures of the magnetostriction ultrasound transducers and their use in chemical reactions appear in Ruhman, A. A., et al. U.S. Pat. No. 6,545,060 B1 (issued Apr. 8, 2003), and its PCT counterpart WO 98/22277 (published May 28, 1998), as well as Yamazaki, N., et al. U.S. Pat. No. 5,486,733 (issued Jan. 23, 1996), Kuhn, M. C., et al. U.S. Pat. No. 4,556,467 (issued Dec. 3, 1985), Blomqvist, P., et al. U.S. Pat. No. 5,360,498 (issued Nov. 1, 1994), and Sawyer, H. T., U.S. Pat. No. 4,168,295 (issued Sep. 18, 1979). The Ruhman et al. patent discloses a magnetostriction transducer that produces ultrasonic vibrations in a continuous-flow reactor in which the vibrations are oriented radially relative to the direction of flow and the frequency range is limited to a maximum of 30 kHz. The Yamazaki et al. patent discloses a small-scale ultrasonic horn operating at relatively low power, in which magnetostriction is listed as one of a group of possible vibration-generating sources together with piezoelectric elements and electrostrictive strain elements. The Kuhn et al. patent discloses a continuous-flow processor that includes a multitude of ultrasonic horns and generators supplying frequencies less than 100 kHz. The Blomqvist et al. patent discloses an ultrasonic generator utilizing a magnetostrictive powder composite operating at a resonance frequency of 23.5 kHz. The Sawyer et al. patent discloses a flow-through reaction tube with three sets of ultrasonic transducers, each set containing four transducers and delivers ultrasound at a frequency of 20 to 40 kHz. These systems are suitable for high-throughput reactions where a high reaction yield is required.

SUMMARY OF THE INVENTION

It has now been discovered that ultrasound can be supplied to a reaction system at high energy and high frequency by an ultrasound generator driven by a loop of magnetostrictive material wound with an electric coil across which an oscillating voltage is imposed. The oscillating voltage produces ultrasonic vibrations in the loop, and these vibrations are transmitted to an ultrasonic horn that extends into the reaction medium where the horn is in direct contact with the reactant(s). The loop preferably conforms in shape and dimensions to the magnetic field produced by the current passing through the coil. The ultrasound generator is preferably installed in a continuous-flow reactor, where it induces a chemical reaction in a liquid reaction medium passing through the reactor. This invention thus resides in an ultrasound generator, a continuous-flow reactor that contains the generator, and in a method of using the generator for performing a chemical reaction that can be enhanced by ultrasound. In certain embodiments of this invention, a sensing component and controller are included to maintain the ultrasonic vibrations at a target value in terms of amplitude, frequency, or both.

This invention is useful in the performance of any chemical reaction whose yield, reaction rate, or both can be enhanced by ultrasound, and is particularly useful in the desulfurization of crude oil and crude oil fractions. Processes disclosing the use of ultrasound in treating these materials are disclosed in commonly owned U.S. Pat. No. 6,402,939 (issued Jun. 11, 2002), U.S. Pat. No. 6,500,219 (issued Dec. 31, 2002), U.S. Pat. No. 6,652,992 (issued Nov. 25, 2003), U.S. Published Patent Application No. US 2003-0051988 A1 (published Mar. 20, 2003), and U.S. Published Patent Application No. US 2004-0079680 A1 (published Apr. 29, 2004). All patents, patent applications, and publications in general that are cited in this specification are incorporated herein by reference in their entirety for all legal purposes that are capable of being served thereby.

DETAILED DESCRIPTION OF THE INVENTION AND PREFERRED EMBODIMENTS

Figure 1:
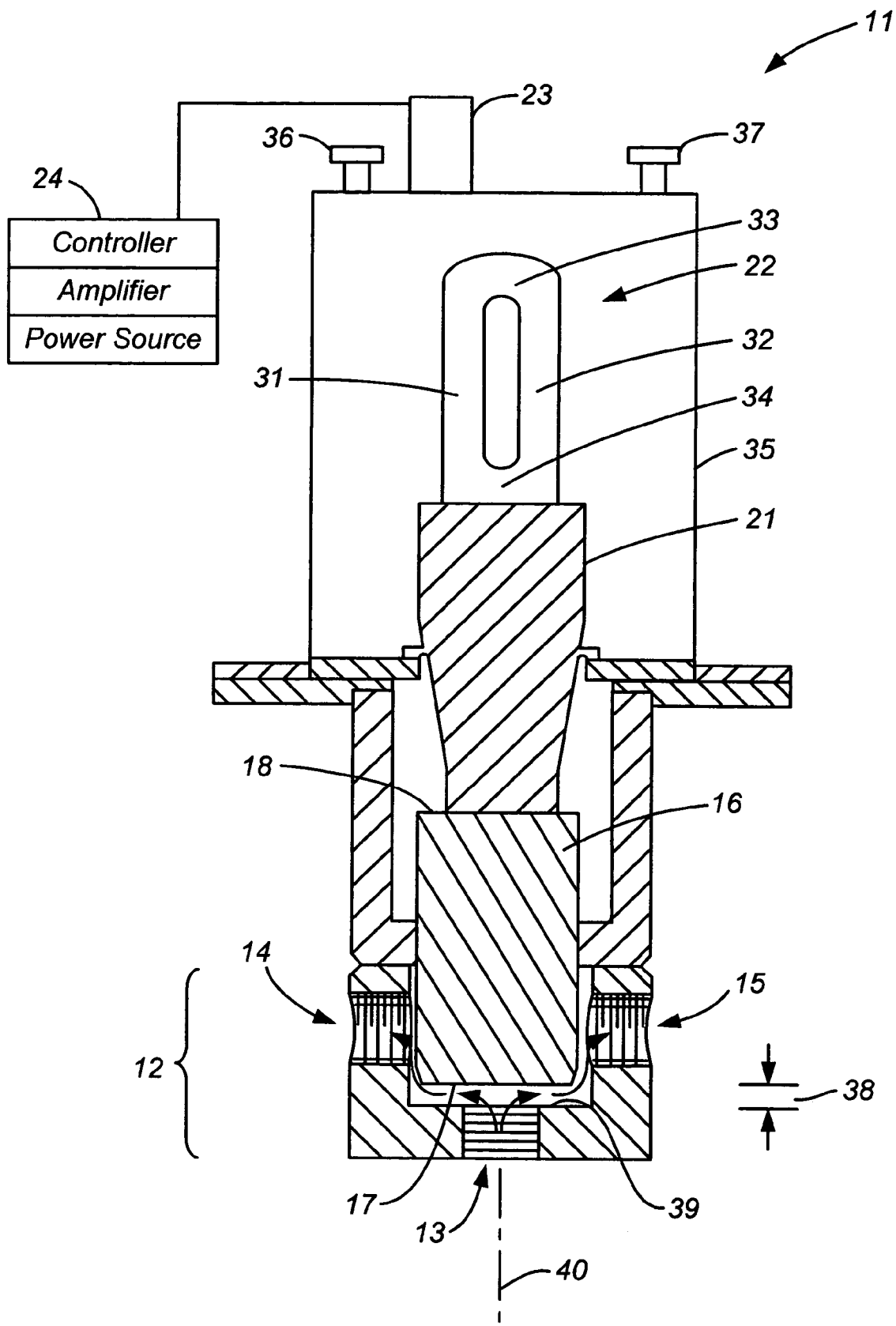
FIG. 1 is a cross section of a continuous-flow reactor with an ultrasound generator in accordance with the present invention mounted to the reactor.

In accordance with this invention, ultrasonic vibrations are transmitted to an ultrasonic horn by a loop-shaped transducer that converts periodically varying voltages to mechanical vibrations in the ultrasound range by way of magnetostriction. The loop-shaped ultrasonic transducer thus operates as an electromagnet and is formed of magnetostrictive material, preferably a soft magnetic alloy. Soft magnetic alloys are alloys that become magnetic in the presence of an electric field but retain little or no magnetism after the field is removed. Soft magnetic alloys are well known, and any such alloy is suitable for use in the present invention. Examples are iron-silicon alloys, iron-silicon-aluminum alloys, nickel-iron alloys, and iron-cobalt alloys, many of which contain additional alloying elements such as chromium, vanadium, and molybdenum. Examples of trade names under which these alloys are sold are HIPERCO® 27, HIPERCO® 35, 2V PERMENDUR®, and SUPERMEN- DUR. A presently preferred alloy is HIPERCO® Alloy 50A (High Temp Metals, Inc., Sylmar, Calif., USA). A magnetostrictive material is one that undergoes a physical change in size or shape as the result of the application of a magnetic field. Magnetostrictive materials are likewise well known in the art, as are materials that are both magnetostrictive and soft magnetic alloys. In embodiments of the invention in which a sensing magnet is also employed, the sensing magnet is likewise made of a magnetostrictive material, and again preferably a soft magnetic alloy. For convenience, the same alloy can be used for both the transducer and the sensing magnet.

The size of the loop can vary depending on the energy needed to achieve the conversion or yield sought in the chemical reaction. Best results will be achieved in most cases with a loop that is elongated, i.e., one whose length is greater than its width. Preferred loops are those whose length ranges from about 5 cm to about 50 cm, or more preferably from about 9 cm to about 30 cm. Also preferred are elongated loops that are formed from two straight, parallel lengthwise sections joined at the ends, with a gap between the lengthwise sections that ranges from about 0.5 cm to about 5 cm, and most preferably from about 1 cm to about 3 cm, in width.

In particularly preferred embodiments, the loop is formed as a stack of thin, flat plates of magnetostrictive material joined to form a laminate that contains a layer of dielectric material between each pair of adjacent plates. The dielectric layers are preferably a plastic resin or a ceramic adhesive. The number of plates in the stack can not vary and is critical other than to accommodate the desired level of power and intensity of the ultrasonic vibrations. In most cases, however, best results will be achieved with 50 to 1,000 plates, or preferably 100 to 400 plates. The thickness of each plate can also vary, although thin plates are preferred in order to reduce eddy current losses. In preferred embodiments, the thickness of a single plate ranges from about 4 microns to about 400 microns, and most preferably from about 50 microns to about 250 microns. In a presently preferred embodiment, 400 plates are used, each having a thickness of 100 microns, with a 25-micron layer of dielectric resin between each adjacent pair of plates. When a sensing magnet is included, the sensing magnet is also preferably loop-shaped, and in particularly preferred embodiments, the length and width of the sensing magnet are the same as those of the transducer loop. The sensing magnet is also preferably a stack of thin, flat plates, most preferably of the same dimensions as the plates of the transducer loop.

In a presently preferred method of fabricating the plates used in the plate stacks, individual plates are cut from a sheet of raw magnetic alloy material of the desired thickness, and each plate is cut to a length equal to one-half the wavelength of the desired resonating frequency. Thus, for a resonating frequency of 17.5 kHz, for example, the preferred length of each plate is 5.0 to 5.5 inches (12.7 to 14.0 cm). Likewise for a resonating frequency of 35 kHz, the preferred plate length is about 2.55 to 2.75 inches (6.5 to 7.0 cm). The central elongated opening of each plate is cut large enough to permit the passage of electrical wire to form the coils on each side of the opening. Once cut, the plates can be heat treated to maximize their performance as components of an ultrasound transducer. In a presently preferred method of treatment, the plates are heated in an inert atmosphere at a rate of 1,000 deg F./hour (556 deg C./hour) to 900° F. (482° C.), then at 400 deg F./hour (222 deg C./hour) to 1,625° F. (885° C.), then soaked at 1,625° F. (885° C.) for several hours (preferably 3 to 4 hours), then cooled at 3.2 deg F./hour (1.7 deg C./hour) to 600° F. (316° C.), and finally cooled to room temperature. The desired number of plates are then bonded together with the dielectric adhesive to form a stack. Once bonded, the plate stack is joined to the ultrasonic horn, or to a support block in which the horn is mounted. In a currently preferred method, bonding is achieved by brazing the transducer to the surface of the horn or block with a silver brazing material.

The transducer loop is wound with a coil of electrically conductive wire, and when a sensing loop is present, the sensing loop is wound with electrically conductive wire as well. The windings around the transducer loop are arranged and oriented to produce magnetostrictive vibrations in the loop when a varying voltage is imposed across the windings. For the maximum result, the windings around the transducer loop are preferably coiled in a direction such that the coil around one lengthwise section of the loop is in a direction opposite to that of the coil around the other lengthwise section. When a voltage is applied across both windings the magnetic polarities arising from the resulting current are in opposite directions and magnetostrictive forces are created in a direction parallel to the lengthwise dimension of the loop. When a sensing loop is present, the windings around the two sides of the sensing loop are preferably a single winding that encircles one side and continues to the other side, such that the windings around the two sides are in series. Both sides of the sensing loop are preferably wound to have the same magnetic polarity and the sensing magnet as a whole will respond to the vibrations produced by the driving magnet with a reverse magnetostrictive effect that generates magnetic field oscillations in the sensing loop. These magnetic field oscillations in turn produce voltage oscillations in the coils around the sensing loop. The voltage oscillations can be sent to a controller and compared with a target value.

The ultrasonic horn can be of any conventional shape and size that maybe known in the prior art for ultrasonic horns in general. The horn may for example be rod-shaped, preferably of circular cross section, and suitable lengths may range from about 5 cm about 100 cm, depending on the reactor size, and preferably from about 10 cm to about 50 cm, with a diameter of from about 3 cm to about 30 cm, and preferably from about 5 cm to about 15 cm. The ultrasonic transducer loop is operatively joined to the horn, i.e., by a physical connection that transmits the mechanical vibrations of the loop to the horn. Metals from which the horn can be made are well known in the art of ultrasound. Examples are steel, stainless steel, nickel, aluminum, titanium, copper, and various alloys of these metals. Aluminum and titanium are preferred.

The transducer can be powered by any oscillating voltage. The oscillations can assume any waveform, ranging for example from a sinusoidal waveform to a rectangular waveform. By "rectangular waveform" is meant a direct current voltage that alternates between a constant positive value and a baseline with stepwise voltage changes in between. Rectangular waveforms that are preferred in the practice of this invention are those in which the baseline is a negative voltage rather than a zero voltage, and preferably those in which the alternating positive and negative voltages are of the same magnitude. Preferred voltage amplitudes are from about 140 volts to about 300 volts, with about 220 volts single-phase most preferred, and preferred wattages are from about 12 kilowatts to about 20 kilowatts. The frequency of the voltage oscillation will be selected to achieve the desired ultrasound frequency. Preferred frequencies are in the range of about 10 to about 30 kilohertz, and most preferably from about 17 to about 20 kilohertz.

Ultrasound transducers in accordance with this invention will function most effectively when cooled during use. Cooling of the transducer loop, and the sensing loop when present, can conveniently be achieved by enclosing these loops in a jacket or housing through which a coolant is passed or circulated. The ultrasound generator is preferably mounted to a reaction vessel with the ultrasound horn protruding into the vessel interior while the transducer, sensor, and coolant jacket reside outside the vessel. Water is generally an effective and convenient coolant medium.

Ultrasound generators in accordance with this invention can be used in either batch reactors to promote batch-wise reactions or in continuous-flow reactors for reactions performed in a continuous manner. Continuous-flow reactors are preferred.

While this invention is susceptible to a variety of implementations and configurations, a detailed study of specific embodiments will provide the reader with a full understanding of the concepts of the invention and how they can be applied. One such embodiment is shown in the Figures.

FIG. 1 is an axial cross section of a continuous-flow reactor 11 in which a flowing reaction medium is exposed to ultrasound in accordance with this invention. The reactor consists of a reaction chamber 12 with an entry port 13 for the entry of untreated reaction medium and exit ports, of which two 14, 15 are shown, through which the treated reaction medium leaves the chamber. Mounted to the reactor is an ultrasonic horn 16 whose distal end 17 extends into the interior of the reaction chamber 12. The proximal end 18 of the horn is joined to a connecting block 21 that in turn is joined to an ultrasonic transducer 22. The connecting block 21 serves as vibration transmitter from the transducer 22 to the horn 16, and as a waveguide and booster to increase the amplitude of the ultrasonic vibrations that are produced by the transducer 22. The transducer 22 is joined through a junction box 23 to an electrical power unit 24 which includes a power source, an amplifier, and a controller.

Figure 3:
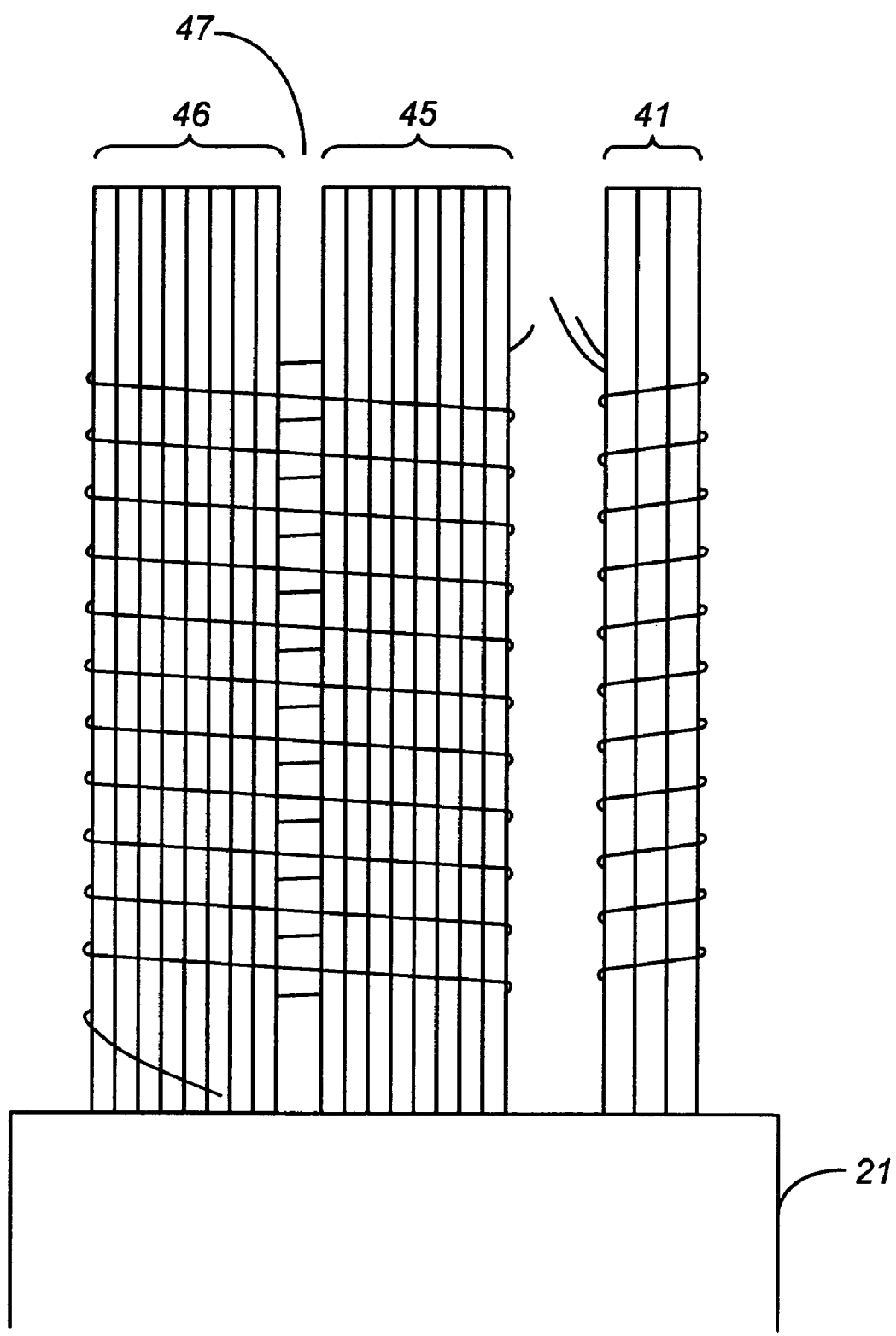
FIG. 3 is an end view of the ultrasonic transducer and sensing component that are part of the ultrasound generator of FIG. 2.
Figure 4:
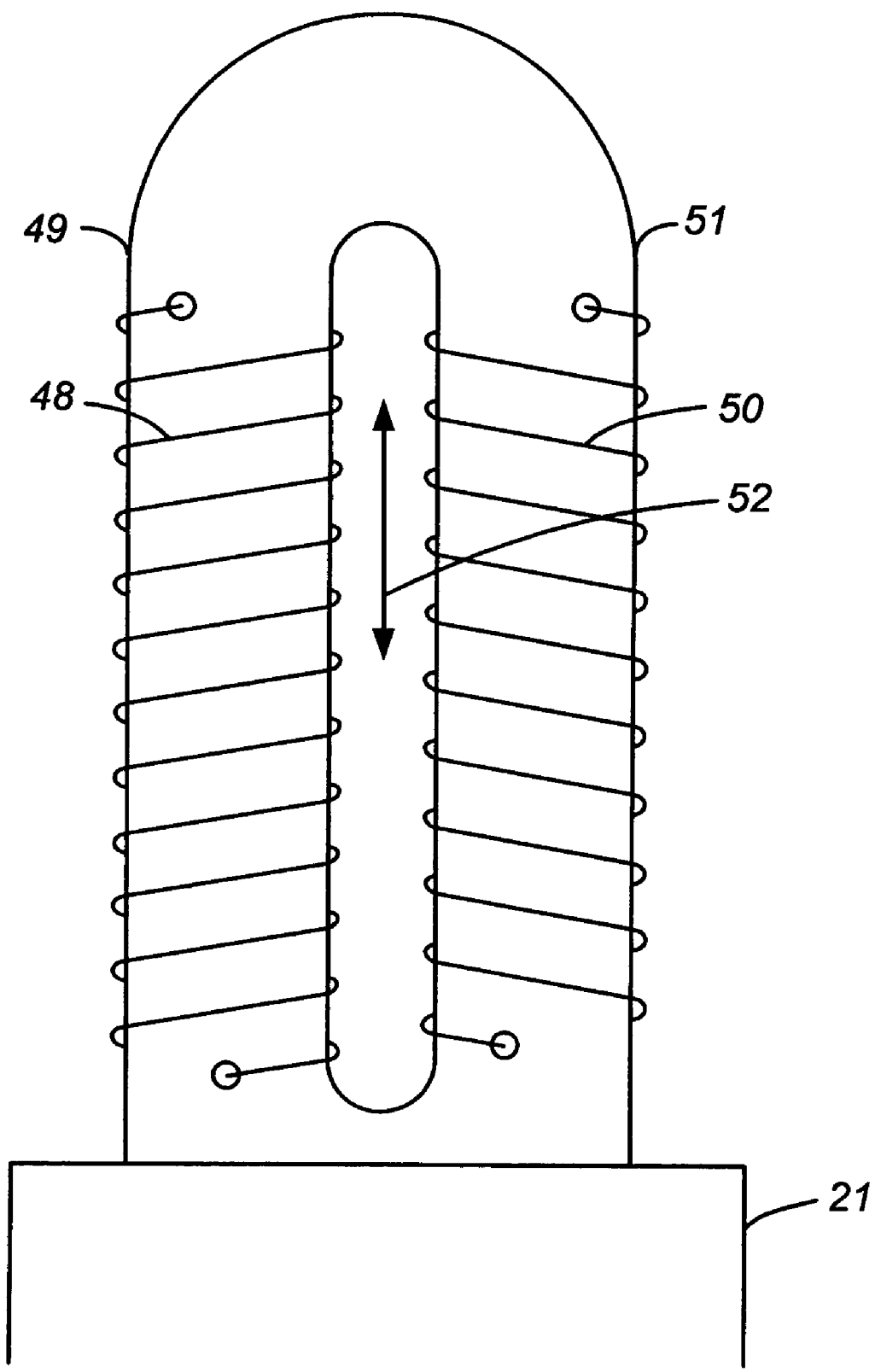
FIG. 4 is a side view of the ultrasonic transducer of FIG. 3.

The ultrasonic transducer 22 in this example is an elongated loop, with two lengthwise sides 31, 32 that are straight and parallel and joined at the top and bottom by connecting sections 33, 34, respectively. The windings associated with the loop encircle the lengthwise sections and are shown in FIGS. 3 and 4, discussed below. A sensing loop can be included but is not visible in this view since the sensing loop has the same profile as the transducer loop 22. The transducer loop 22 and the upper end of the block 21 are enclosed in a housing 35 external to the reactor. Coolant passes continuously through the housing, entering through an inlet port 36 and leaving through an outlet port 37.

The liquid reaction mixture entering the reactor inlet port 13 flows outward across the surface of the distal end 17 of the ultrasonic horn with a continuous, constant flow and little or no dead volume. The horn 16 is cylindrical in shape with a flat distal end 17, and although the dimensions can vary within the scope of this invention, the distal end will preferably be circular with a diameter ranging from about 3 cm to about 30 cm, most preferably from about 5 cm to about 15 cm. The gap 38 between the floor 39 of the reaction chamber and the distal end 17 of the horn can likewise vary, although for best results in most applications, the gap width is less than 3.0 cm, preferably less than 2.0 cm, and most preferably less than 1.5 cm. Preferably, the minimum gap width is 0.5 cm, and most preferably 1.0 cm. The ratio of the surface area of the distal end of the horn 17 to the reaction chamber volume is preferably about 0.5 cm$^{-1}$ or above and most preferably ranges from about 0.5 cm$^{-1}$ to about 5 cm$^{-1}$. In a presently preferred embodiment, the distal end is about 3.0 inches (7.6 cm) in diameter, and the gap is about 0.5 inch (1.3 cm). The reaction chamber 12, ultrasonic horn 16, and connecting block 21 are not limited to particular shapes, but are most conveniently and economically formed as bodies of revolution about a common axis 40.

Figure 2:
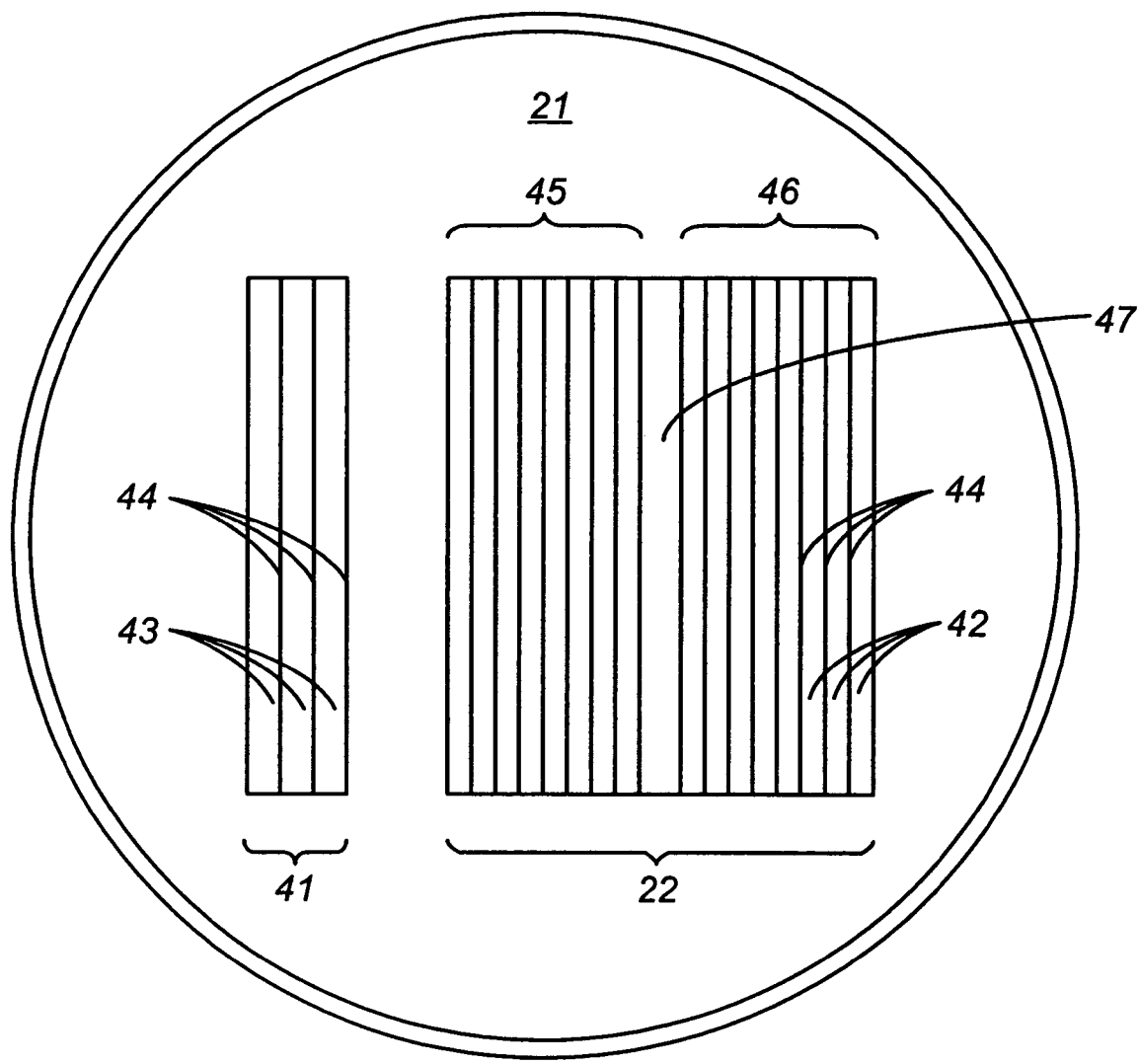
FIG. 2 is a top view of the ultrasound generator of FIG. 1.

FIG. 2 is an upper view of the ultrasonic transducer 22, a sensing magnet 41, and the contacting surface of the connecting block 21. The profile of the sensing magnet 41 is identical to that of the transducer 22, i.e., both are loops of the same height and width, although the sensing magnet is of lesser thickness. Both the transducer and the sensing magnet are formed of stacks of thin metallic plates 42, 43 of magnetostrictive material, bonded together with a dielectric adhesive 44. The plates of the transducer 22 are divided into two groups 45, 46 separated by a gap 47 to facilitate cooling by providing additional surface area for contact with the circulating coolant.

Figure 5:
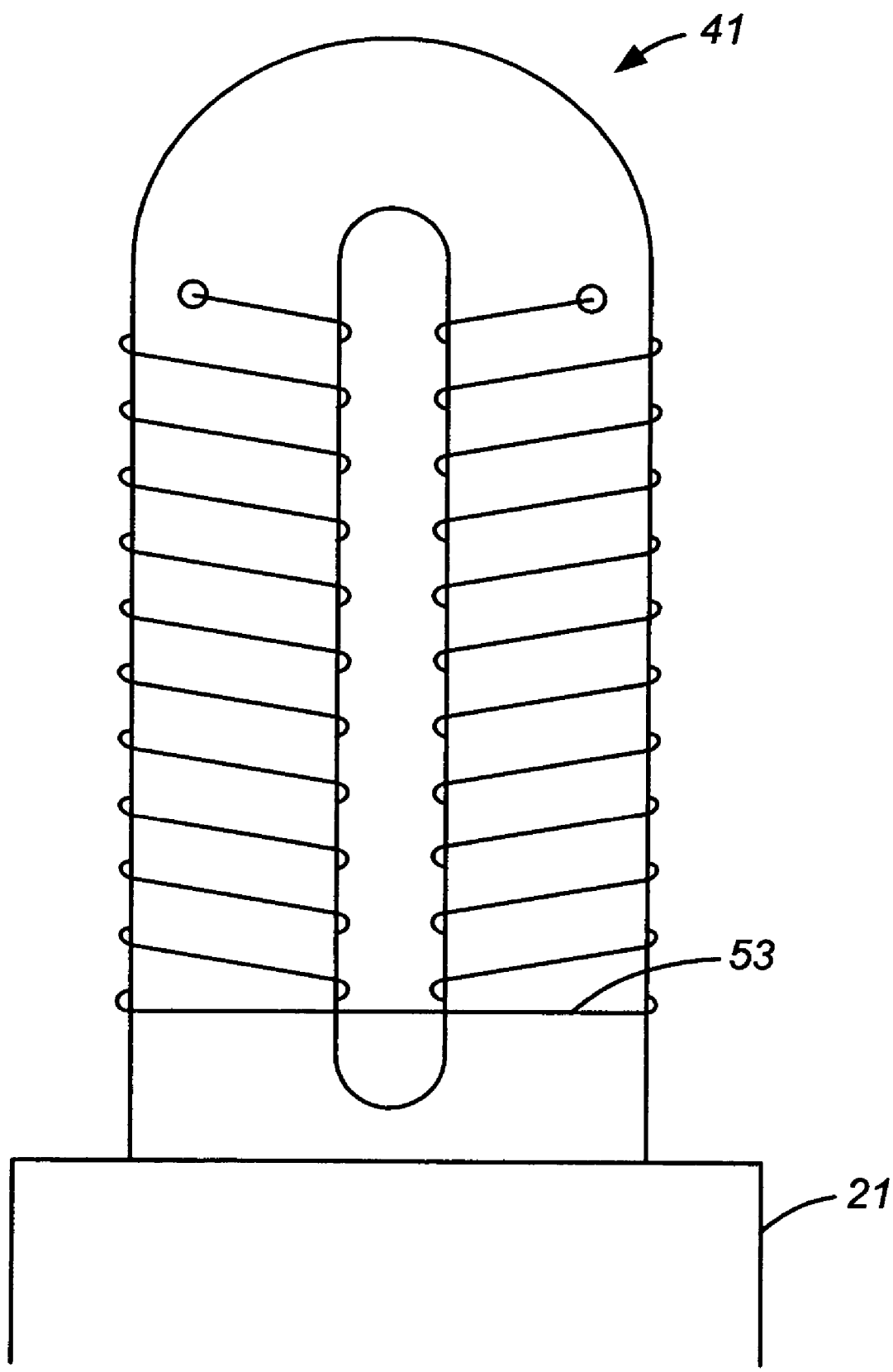
FIG. 5 is a side view of the sensing component of FIG. 3.

The windings are shown in the side views presented in FIGS. 3, 4, and 5. The view of FIG. 3 shows the edges of the plate stacks while the views in FIGS. 4 and 5 show the broad surfaces of the plate stacks.

The windings around the transducer loop are visible in FIGS. 3 and 4. As shown in these Figures, the windings around of each side of the loop are separate from the windings around the other side of the loop, while each side has a single winding that encircles both groups of plates 45, 46 of the stack. Thus, a single coil of wire 48 encircles all plates forming the left side 49 of the loop (FIG. 5), and in so doing, spans the gap 47 between the two groups of plates, and another, independent, single coil 50 encircles all plates forming the right side 51, likewise spanning the gap 47. The two coils 48, 50 are wound in opposite directions, and voltages are applied in such a manner that the magnetic polarity generated in one side of the loop by the current in the winding encircling that side is opposite to the magnetic polarity generated in the other side while magnetostrictive forces are generated in the direction indicated by the arrow 52.

The windings around the sensing loop 41 are visible in FIGS. 3 and 5. A continuous winding 53 is used that encircles one side of the loop and then continues to the other side. With this winding, the changing magnetic fields generated by the drive magnets create a voltage in the winding by magnetic induction, with substantially no magnetostriction effect.

The power components, including the power supply, the amplifier, and the controller, are conventional components available from commercial suppliers and readily adaptable to perform the functions described above. In currently preferred embodiments, a computer-controlled arbitrary waveform generator such as the Agilent 33220A or Advantek 712 with an output DAC (digital-to-analog converter) or a microprocessor drive, voltage controlled waveform generator designed from an 8038 integrated circuit chip are used. The arbitrary waveform generator is auto-tuned by an output DAC on a microprocessor or by functions in a LabVIEW® (National Instruments Corporation, Austin Tex., USA) computer, in which pulse software controls the arbitrary waveform generator to maximize the ultrasonic output by adjusting the pulse frequency to the transducer resonance frequency. The positive and negative pulse components can also be adjusted to give an overall DC component that will maximize the magnetostrictive effect. Other safety features used in a microprocessor or LabVIEW® computer include temperature sensors that will detect power faults and power surges.

Preferred power components consist of IGBT (integrated gate bipolar transistors) in a full bridge power configuration. The full bridge power configuration uses four IGBT transistors formed in a configuration of two half-bridge push-pull amplifiers. Each half bridge section is driven by an asymmetrical rectangular pulse train, the trains being 180 degrees out of phase. The symmetry (i.e., the relative amounts of the positive and negative pulse components) of the pulses that drive each half bridge section can be optimized for maximum ultrasound output power. Each IGBT is isolated from the signal source by an opto-isolation driving transistor. The sensing components measure an AC return signal generated by vibrations in the sensing loop. The frequency of the dual asymmetrical output pulses is optimized by sensing the deflections in the sensing loop or by sensing the output power deliver to the ultrasonic transducer loop.

The foregoing is offered primarily for purposes of illustration. Further variations in the components of the apparatus and system, their arrangement, the materials used, the operating conditions, and other features disclosed herein that are still within the scope of the invention will be readily apparent to those skilled in the art.

What is claimed is:

1. Apparatus for generating ultrasonic vibration, said apparatus comprising:
   an ultrasonic horn,
   a loop-shaped ultrasonic transducer of magnetostrictive material operatively joined to said ultrasonic horn to generate mechanical vibrations and to transmit vibrations so generated to said ultrasonic horn, said ultrasonic transducer comprised of a plurality of plates of magnetostrictive material alternating with layers of dielectric material and wound with drive coils arranged to produce magnetostrictive forces in said ultrasonic transducer in response to voltages applied across said drive coils, and
   a power source for imposing a periodically varying voltage across said drive coils.

2. The apparatus of claim 1 wherein said ultrasonic transducer is greater in length than in width and comprises two parallel lengthwise sections joined at both ends.

3. The apparatus of claim 2 wherein said lengthwise sections are separated by a gap of from about 0.5 cm to about 5 cm.

4. The apparatus of claim 2 wherein said lengthwise sections are separated by a gap of from about 1 cm to about 3 cm.

5. The apparatus of claim 2 wherein said drive coils comprise a first drive coil wound around one lengthwise section and a second drive coil wound around the other lengthwise section, said first and second drive coils being coiled in opposite directions.

6. The apparatus of claim 1 wherein said ultrasonic transducer is comprised of from 50 to 1,000 plates of magnetostrictive material alternating with layers of dielectric resin, each plate ranging in thickness from about 4 microns to about 400 microns.

7. The apparatus of claim 6 wherein each said plate is from about 5 cm to about 50 cm in length.

8. The apparatus of claim 6 wherein each said plate is from about 9 cm to about 30 cm in length.

9. The apparatus of claim 1 wherein said ultrasonic transducer comprises from 100 to 400 plates of magnetostrictive material alternating with layers of dielectric resin, each plate ranging in thickness from about 50 microns to about 250 microns.

10. The apparatus of claim 1 wherein said ultrasonic transducer is joined to said ultrasonic horn by brazing with a silver brazing alloy.

11. The apparatus of claim 1 wherein said periodically varying voltage is a pulsewise voltage at a frequency of from about 10 to about 30 kilohertz.

12. The apparatus of claim 1 wherein said periodically varying voltage is a pulsewise voltage at a frequency of from about 10 to about 30 kilohertz and a wattage of from about 12 to about 20 kilowatts.

13. The apparatus of claim 1 further comprising a sensing magnet of magnetostrictive material wound with a sensing coil, said sensing magnet arranged such that vibrations in said ultrasonic transducer are transmitted to said sensing magnet and generate an oscillating voltage in said sensing coil.

14. The apparatus of claim 13 wherein said sensing magnet is loop-shaped and both said ultrasonic transducer and said sensing magnet are elongated with parallel lengthwise sections, the lengthwise sections of said sensing magnet being approximately equal in length to the lengthwise sections of said ultrasonic transducer.

15. A flow-through reactor for the continuous treatment of a liquid material with ultrasound, said flow-through reactor comprising:
   a reaction vessel with entry and exit ports,
   an ultrasonic horn mounted to said reaction vessel and extending into the interior thereof,
   a loop-shaped ultrasonic transducer of magnetostrictive material operatively joined to said ultrasonic horn to generate mechanical vibrations and to transmit vibrations so generated to said ultrasonic horn, said ultrasonic transducer comprised of a plurality of plates of magnetostrictive material alternating with layers of dielectric material and wound with drive coils arranged to produce magnetostrictive forces in said ultrasonic transducer in response to voltages applied across said drive coils, and
   a power source for imposing a periodically varying voltage across said drive coils.

16. The flow-through reactor of claim 15 wherein said ultrasonic transducer is greater in length than in width and comprises two parallel lengthwise sections joined at both ends.

17. The flow-through reactor of claim 16 wherein said lengthwise sections are separated by a gap of from about 0.5 cm to about 5 cm.

18. The flow-through reactor of claim 16 wherein said lengthwise sections are separated by a gap of from about 1 cm to about 3 cm.

19. The flow-through reactor of claim 16 wherein said drive coils comprise a first drive coil wound around one lengthwise section and a second drive coil wound around the other lengthwise section, said first and second drive coils being coiled in opposite directions.

20. The flow-through reactor of claim 15 wherein said ultrasonic transducer is comprised of from 50 to 1,000 plates of magnetostrictive material alternating with layers of dielectric resin, each plate ranging in thickness from about 4 microns to about 400 microns.

21. The flow-through reactor of claim 20 wherein each said plate is from about 5 cm to about 50 cm in length.

22. The flow-through reactor of claim 20 wherein each said plate is from about 9 cm to about 30 cm in length.

23. The flow-through reactor of claim 15 wherein said ultrasonic transducer comprises from 100 to 400 plates of magnetostrictive material alternating with layers of dielectric resin, each plate ranging in thickness from about 50 microns to about 250 microns.

24. The flow-through reactor of claim 15 wherein said ultrasonic transducer is joined to said ultrasonic horn by brazing with a silver brazing alloy.

25. The flow-through reactor of claim 15 wherein said periodically varying voltage is a pulsewise voltage at a frequency of from about 10 to about 30 kilohertz.

26. The flow-through reactor of claim 15 wherein said periodically varying voltage is a pulsewise voltage at a frequency of from about 10 to about 30 kilohertz and a wattage of from about 12 to about 20 kilowatts.

27. The flow-through reactor of claim 15 further comprising a sensing magnet of magnetostrictive material wound with a sensing coil, said sensing magnet arranged such that vibrations in said ultrasonic transducer are transmitted to said sensing magnet and generate an oscillating voltage in said sensing coil.

28. The flow-through reactor of claim 27 wherein said sensing magnet is poop-shaped and both said ultrasonic transducer and said sensing magnet are elongated with parallel lengthwise sections, the lengthwise sections of said sensing magnet being approximately equal in length to the lengthwise sections of said ultrasonic transducer.

29. A method for performing a chemical reaction enhanced by ultrasound, said method comprising:
  passing material to be reacted, in liquid form, through an ultrasound chamber in which said material is exposed to ultrasound generated by an ultrasonic transducer comprising a loop-shaped ultrasonic horn of magnetostrictive material operatively joined to said ultrasonic horn to generate mechanical vibrations and to transmit vibrations so generated to said ultrasonic horn, said ultrasonic transducer comprised of a plurality of plates of magnetostrictive material alternating with layers of dielectric material and wound with drive coils arranged to produce magnetostrictive forces in said ultrasonic transducer in response to voltages applied across said drive coils, while
  imposing a periodically varying voltage across said drive coils.

30. The method of claim 29 wherein said ultrasonic transducer is greater in length than in width and comprises two parallel lengthwise sections joined at both ends.

31. The method of claim 30 wherein said lengthwise sections are separated by a gap of from about 0.5 cm to about 5 cm.

32. The method of claim 30 wherein said lengthwise sections are separated by a gap of from about 1 cm to about 3 cm.

33. The method of claim 30 wherein said drive coils comprise a first drive coil wound around one lengthwise section and a second drive coil wound around the other lengthwise section, said first and second drive coils being coiled in opposite directions.

34. The method of claim 29 wherein said ultrasonic transducer is comprised of from 50 to 1,000 plates of magnetostrictive material alternating with layers of dielectric resin, each plate ranging in thickness from about 4 microns to about 400 microns.

35. The method of claim 34 wherein each said plate is from about 5 cm to about 50 cm in length.

36. The method of claim 34 wherein each said plate is from about 9 cm to about 30 cm in length.

37. The method of claim 29 wherein said ultrasonic transducer comprises from 100 to 400 plates of magnetostrictive material alternating with layers of dielectric resin, each plate ranging in thickness from about 50 microns to about 250 microns.

38. The method of claim 29 comprising periodically varying said voltage in pulsewise manner at a frequency of from about 10 to about 30 kilohertz.

39. The method of claim 29 comprising periodically varying said voltage in pulsewise manner at a frequency of from about 10 to about 30 kilohertz and a wattage of from about 12 to about 20 kilowatts.

40. The method of claim 29 further comprising sensing vibrations in said ultrasonic transducer with a sensing magnet of magnetostrictive material wound with a sensing coil, thereby generating an oscillating voltage in said sensing coil, and transmitting said oscillating voltage to a controller.

* * * * *